(12) United States Patent
Matulla et al.

(10) Patent No.: US 10,194,492 B2
(45) Date of Patent: Jan. 29, 2019

(54) INDUCTION COIL ASSEMBLY FOR AN INDUCTION COOKING HOB

(71) Applicant: ELECTROLUX APPLIANCES AKTIEBOLAG, Stockholm (SE)

(72) Inventors: Daniel Matulla, Rothenburg ob der Tauber (DE); Holger Wundling, Rothenburg ob der Tauber (DE); Ulrich Häutle, Rothenburg ob der Tauber (DE); Dieter Förster, Rothenburg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 15/744,943

(22) PCT Filed: Jul. 12, 2016

(86) PCT No.: PCT/EP2016/066512
§ 371 (c)(1),
(2) Date: Jan. 15, 2018

(87) PCT Pub. No.: WO2017/036647
PCT Pub. Date: Mar. 9, 2017

(65) Prior Publication Data
US 2018/0213613 A1 Jul. 26, 2018

(30) Foreign Application Priority Data
Sep. 2, 2015 (EP) .................................... 15183413

(51) Int. Cl.
*H05B 6/12* (2006.01)
*H05B 6/36* (2006.01)

(52) U.S. Cl.
CPC ............. *H05B 6/12* (2013.01); *H05B 6/1254* (2013.01); *H05B 6/1272* (2013.01);
(Continued)

(58) Field of Classification Search
CPC ..... H05B 6/062; H05B 6/1209; H05B 6/1245; H05B 6/1254; H05B 6/1263;
(Continued)

(56) References Cited

U.S. PATENT DOCUMENTS 5,658,482 A * 8/1997 Gaspard ............... H05B 6/1245
219/620
2009/0314771 A1* 12/2009 Okada ..................... H05B 6/062
219/660
(Continued)

FOREIGN PATENT DOCUMENTS

| EP | 2410815 | 1/2012 |
|---|---|---|
| EP | 2490505 | 8/2012 |
| WO | 2014045251 | 3/2014 |

OTHER PUBLICATIONS

International Search Report and Written Opinion for PCT/EP2016/066512 dated Oct. 18, 2016, 8 pages.

*Primary Examiner* — Hung D Nguyen
(74) *Attorney, Agent, or Firm* — Pearne & Gordon LLP

(57) ABSTRACT

An induction coil assembly for an induction cooking hob has a coil winding, a lower electrically isolating sheet and optionally a thermally insulating sheet. The induction coil assembly further includes a carrier plate for supporting the lower electrically isolating sheet, the coil winding and the thermally insulating sheet. At least two power cables are provided for each coil winding. The power cables are at least partially arranged at a bottom side of the carrier plate and act as spring elements, so that the induction coil assembly can be pressed or is pressed against a glass ceramic panel of the induction cooking hob.

18 Claims, 3 Drawing Sheets

Figure 1:
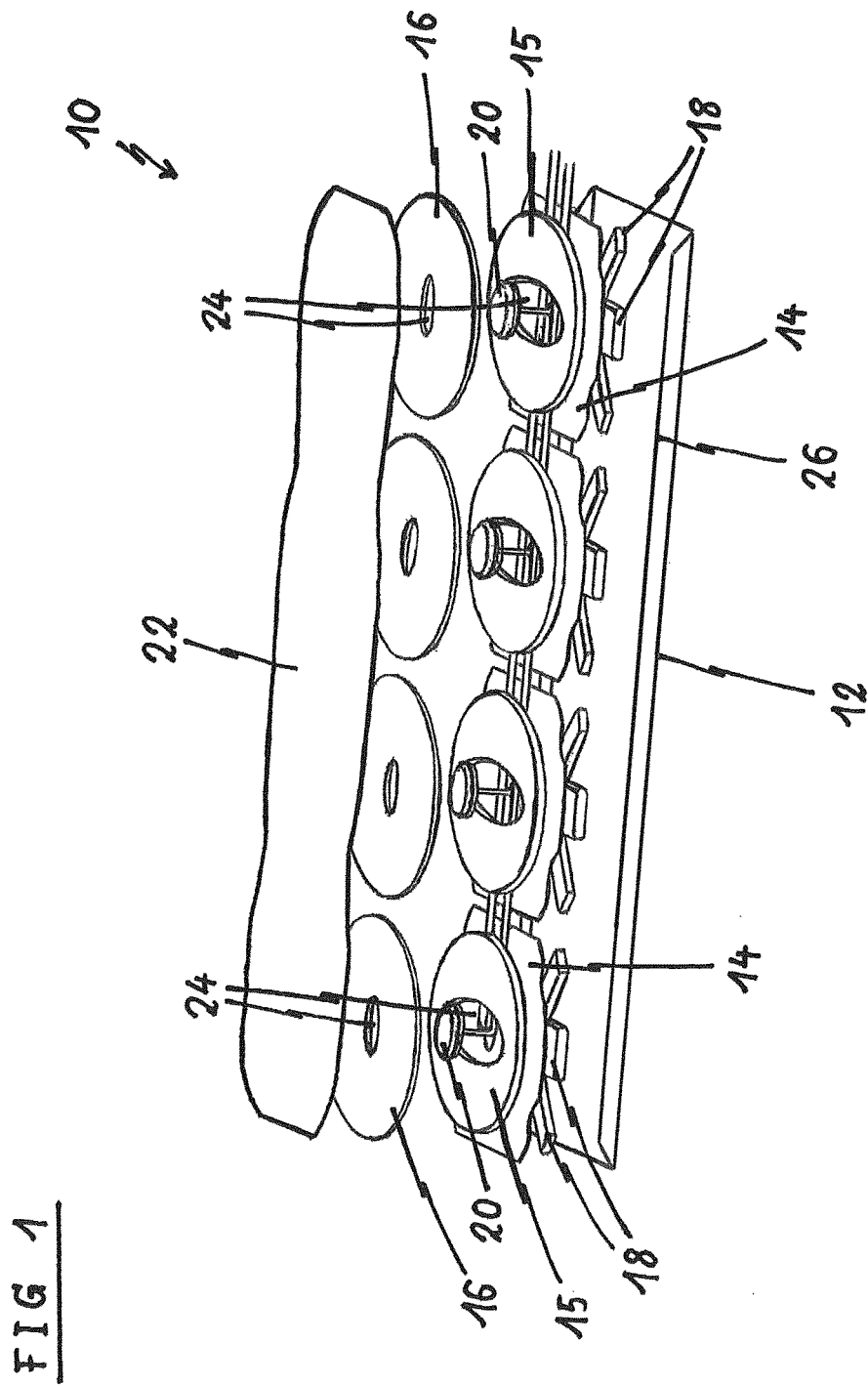

(52) U.S. Cl.
CPC .... *F24H 2250/08* (2013.01); *H05B 2206/022* (2013.01); *H05B 2213/03* (2013.01); *H05B 2213/07* (2013.01); *Y02B 40/126* (2013.01)

(58) Field of Classification Search
CPC ............... H05B 6/1271; H05B 6/1272; H05B 2206/022; H05B 2213/03; H05B 2213/07; H05B 6/12; Y02B 40/123; Y02B 40/126; Y24H 2250/08
USPC ....... 219/620, 622, 627, 660, 661, 662, 667, 219/668, 671, 672, 675, 676, 624
See application file for complete search history.

(56) References Cited

U.S. PATENT DOCUMENTS

| | | | |
|---|---|---|---|
| 2010/0237064 A1* | 9/2010 | Liu | H05B 6/1209 219/622 |
| 2012/0223070 A1* | 9/2012 | Matsui | H05B 6/1254 219/677 |
| 2015/0114953 A1* | 4/2015 | Suzuki | H05B 6/1209 219/620 |

* cited by examiner

INDUCTION COIL ASSEMBLY FOR AN INDUCTION COOKING HOB

The present invention relates to an induction coil assembly for an induction cooking hob. Further, the present invention relates to an induction cooking hob comprising at least one induction coil assembly.

An induction cooking hob comprises a number of induction coils arranged within said induction cooking hob. The induction coils should lie against the bottom side of a glass ceramic panel of the induction cooking hob. Typically, the induction coils are supported by a coil carrier of the induction cooking hob. Each induction coil has to be fastened within said induction cooking hob. Usually, the induction coil consists of a lower electrically isolating sheet, a coil winding upon said lower electrically isolating sheet and a thermally insulating sheet upon said coil winding. Additionally, an upper electrically isolating sheet is arranged above the thermally insulating sheet and ferrite elements are arranged beneath the lower electrically isolating sheet. Further, an electric connection between the coil winding and a power supply unit is required. If the induction cooking hob comprises temperature sensors, then an electric connection between said temperature sensors and a control unit is required. Mostly, the installation of the components of the induction cooking hob is very complex.

It is an object of the present invention to provide an induction cooking hob or a part of an induction cooking hob, which allows a suitable arrangement of the components by low complexity.

According to the present invention an induction coil assembly for an induction cooking hob is provided, wherein

- the induction coil assembly comprises at least one coil winding, at least one lower electrically isolating sheet and optionally at least one thermally insulating sheet,
- the coil winding is dedicated to one lower electrically isolating sheet and one thermally insulating sheet,
- the coil winding is arranged above the dedicated lower electrically isolating sheet,
- the thermally insulating sheet is arranged above the dedicated coil winding,
- the induction coil assembly comprises a carrier plate provided for supporting the lower electrically isolating sheet, the coil winding and the thermally insulating sheet,
- the carrier plate is made of a metal sheet, preferably an aluminium sheet, or of a plastic sheet,
- for each coil winding the induction coil assembly comprises at least two power cables connected to said dedicated coil winding on the one hand and connectable or connected to a power supply unit of the induction cooking hob on the other hand,
- the induction coil assembly is installable or installed within the induction cooking hob and between a coil carrier and a glass ceramic panel of said induction cooking hob, and
- the power cables are at least partially arranged at a bottom side of the carrier plate and act as spring elements, so that the induction coil assembly can be pressed or is pressed against the glass ceramic panel of the induction cooking hob.

The induction coil assembly forms a modular unit of the induction cooking hob. The complete induction coil assembly is installable or installed inside the induction cooking hob. The carrier plate supports one or more induction coils and forms the base plate of the induction coil assembly. The one or more induction coils are installable into the induction cooking hob by one step. Since the power cables at the bottom side of the carrier plate act as spring elements, the induction cooking hob and the induction coil assembly do not require any special spring element. The power cable includes conductive, shieling and isolating materials, so that the heterogeneous structure of the power cable allows properties like the spring element, in particular in combination with the carrier plate. This reduces the complexity of the induction cooking hob and the induction coil assembly.

Preferably, the induction coil assembly comprises two or more coil windings and dedicated lower electrically isolating sheets and thermally insulating sheets, wherein said coil windings and dedicated sheets, respectively, are arranged in series, and wherein preferably the coil windings and/or the thermally insulating sheets have elliptical, circular, rectangular, triangular and/or square base areas. Alternatively, the coil windings may be arranged as a matrix on the carrier plate. According to one embodiment, the coil windings are arranged in series on the carrier plate, wherein a number of said carrier plates are arranged in parallel, so that the coil windings are arranged as a matrix on the induction cooking hob. In general, the coil windings may have any arbitrary suitable base areas.

Further, the induction coil assembly may comprise at least one temperature sensor, wherein preferably at least one temperature sensor is dedicated for each induction coil.

In particular, the temperature sensor is arranged within a recess formed in the thermally insulating sheet and/or coil winding, wherein preferably said recess is formed in a central portion of the thermally insulating sheet and/or coil winding, respectively.

Moreover, the induction coil assembly comprises at least one sensor cable for each temperature sensor, wherein said sensor cable is connected to the dedicated temperature sensor on the one hand and connectable or connected to a control unit of the induction cooking hob on the other hand.

Furthermore, the carrier plate includes a number of bore holes or cut-outs, wherein at least a part of said bore holes or cut-outs is arranged beneath the temperature sensors, and wherein the size of the bore hole or cut-out beneath the temperature sensor is provided for adjusting an airflow for cooling said temperature sensor, and wherein preferably at least a part of said bore holes or cut-outs is reinforced by a thicker material, a traverse and/or an embossment. Alternatively, the bore holes or cut-outs are formed without any reinforcing elements. By the size of the bore hole or cut-out the airflow for cooling the temperature sensor can be controlled.

Additionally, the induction coil assembly comprises an upper electrically isolating sheet arranged above the one or more thermally insulating sheets. The upper electrically isolating sheet is provided for covering all thermally insulating sheets and the coil winding beneath them.

In particular, the carrier plate includes a number of cable holes, wherein each cable hole is provided for one power cable, and wherein preferably the cable holes are arranged close to the border of the carrier plate.

Further, the carrier plate includes a number of pin holes provided for receiving pins, in particular for fastening the carrier plate on a coil carrier of the induction cooking hob, wherein preferably at least a part of said pin holes is reinforced by a thicker material, a traverse and/or an embossment arranged beside the longitudinal edges of the carrier plate. Alternatively, the pin holes may be formed without any reinforcing elements.

Moreover, the induction coil assembly may comprise a plurality of ferrite elements arranged between the carrier plate and the lower electrically isolating sheet, wherein preferably said ferrite elements are formed as stripes, rectangular sheets or semicircular sheets arranged radially or according to another regular patter beneath each lower electrically isolating sheet.

In this case, the ferrite elements may be glued and/or clipped on the carrier plate, wherein preferably the lower electrically isolating sheet is glued on said dedicated ferrite elements.

Preferably, the coil winding is glued on the dedicated lower electrically isolating sheet.

In contrast, the thermally insulating sheet is disposed on the dedicated coil winding, wherein preferably the upper electrically isolating sheet is disposed on the one or more thermally insulating sheets.

In particular, the carrier plate includes at least one bend edge formed at one or more sides of said carrier plate, wherein preferably the bend edge is formed at one or two longitudinal sides of the carrier plate. The bend edge allows a stabilization of the carrier plate.

At last, the present invention relates to an induction cooking hob comprising at least one induction coil assembly mentioned above, wherein the at least one induction coil assembly is arranged within the induction cooking hob and beneath a glass ceramic panel of said induction cooking hob.

Novel and inventive features of the present invention are set forth in the appended claims.

Figure 2:
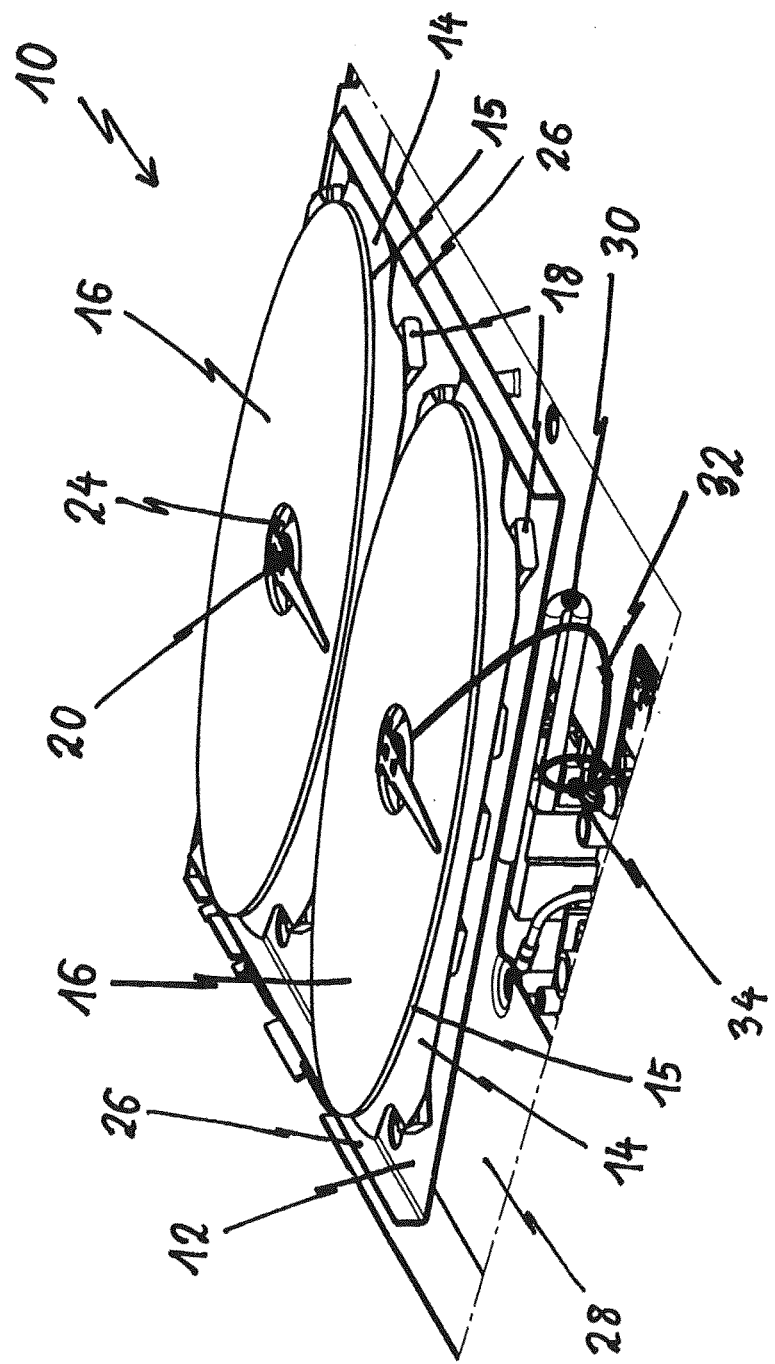
Figure 3:
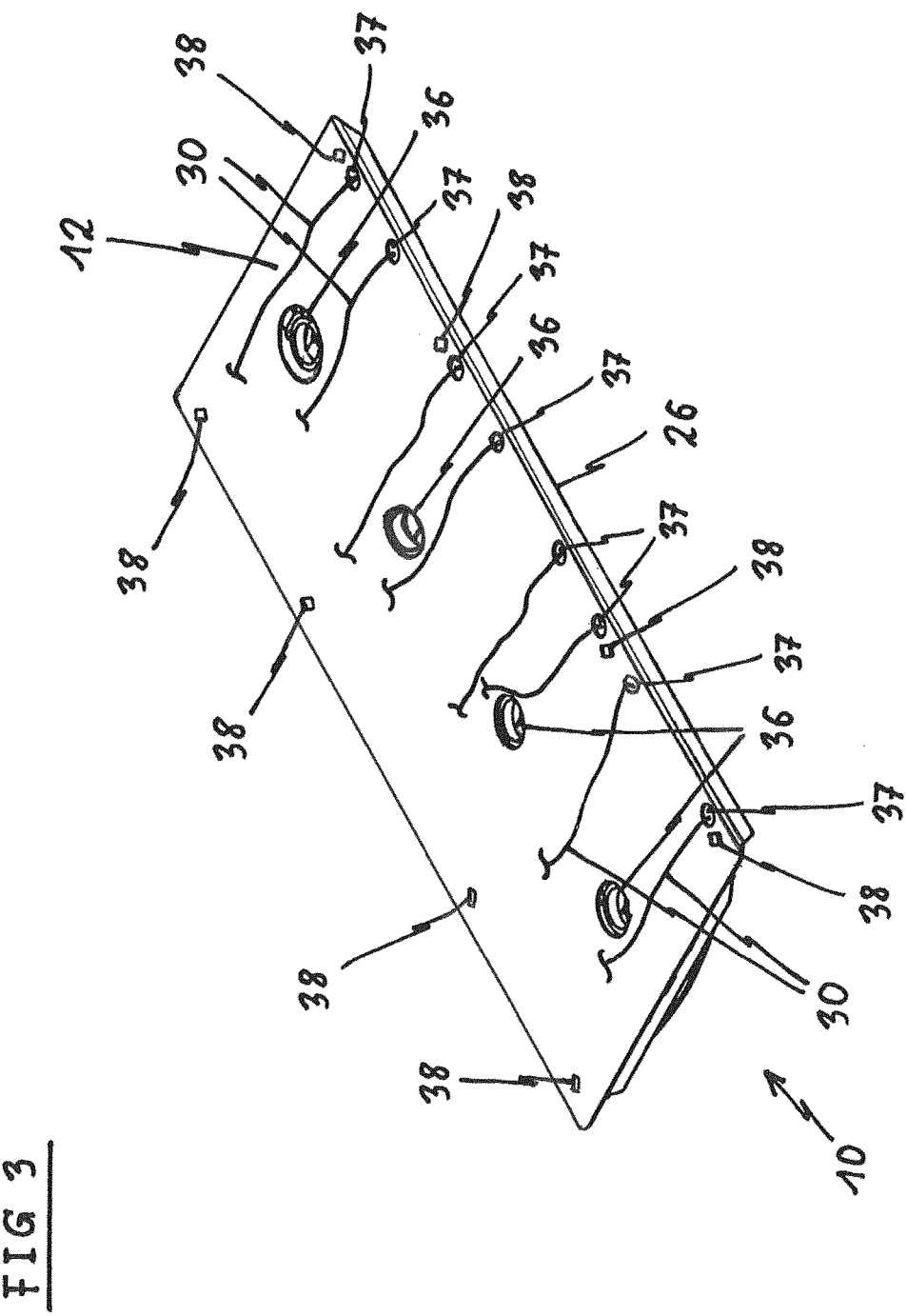

The present invention will be described in further detail with reference to the drawing, in which FIG. 1 illustrates a schematic exploded perspective top view of an induction coil assembly according to a preferred embodiment of the present invention, FIG. 2 illustrates a sectional perspective top view of the induction coil assembly according to the preferred embodiment of the present invention, and FIG. 3 illustrates a perspective bottom view of the induction coil assembly according to the preferred embodiment of the present invention.

FIG. 1 illustrates a schematic exploded perspective top view of an induction coil assembly 10 according to a preferred embodiment of the present invention. The induction coil assembly 10 forms a modular unit of an induction cooking hob. The induction coil assembly 10 as a whole is installable or installed inside the induction cooking hob. Preferably, the induction coil assembly 10 is arranged beneath a glass ceramic panel and above a coil carrier 28 of said induction cooking hob. One or more induction coil assemblies 10 may be installable or installed in one induction cooking hob.

The induction coil assembly 10 comprises a carrier plate 12, a number of lower electrically isolating sheets 14, a number of coil windings 15, a number of thermally insulating sheets 16 and an upper electrically isolating sheet 22. Each coil winding 15 is arranged upon a dedicated lower electrically isolating sheet 14. A thermally insulating sheet 16 is disposed upon each coil winding 15. The upper electrically isolating sheet 22 is disposed above the thermally insulating sheets 16. The carrier plate 12 is provided for supporting the coil windings 15 and the corresponding sheets 14, 16 and 22.

Further, the induction coil assembly 10 comprises ferrite elements 18 and temperature sensors 20. In this example, the ferrite elements 18 are formed as stripes and star-shaped beneath each lower electrically isolating sheet 14. The ferrite elements 18 are glued or clipped on the carrier plate 12. The lower electrically isolating sheets 14 are arranged above the ferrite elements 18. In this example, the ferrite elements 18 formed as stripes are arranged radially beneath each carrier plate 12. The temperature sensor 20 is arranged within a recess 24 formed in the dedicated lower electrically isolating sheet 14, coil winding 15 and thermally insulating sheet 16 in each case.

According to the preferred embodiment the one upper electrically isolating sheet 22 is formed as a single-piece part and covers all thermally insulating sheets 16. Alternatively, the induction coil assembly 10 may comprise two or more upper electrically isolating sheets 22, wherein each upper electrically isolating sheet 22 covers one or more neighboured thermally insulating sheets 16.

For example, the lower electrically isolating sheets 14 and the upper electrically isolating sheet 22 are made of mica and/or glimmer. Further, the thermally insulating sheets 16 may be made of melange. Preferably, the coil windings 15 are made of copper.

In this example, the carrier plate 12 supports four lower electrically isolating sheets 14, four coil windings 15, four thermally insulating sheets 16 and an upper electrically isolating sheet 22, wherein the lower electrically isolating sheets 14, the coil windings 15 and the thermally insulating sheets 16, respectively, are arranged in series. Alternatively, the coil windings 16 and the corresponding sheets 14 and 16 may be arranged as a matrix on the carrier plate 12. In particular, the coil windings 16 and the corresponding sheets 14 and 16 are arranged in series on the carrier plate 12, wherein a number of said carrier plates 12 are arranged in parallel, so that the coil windings 16 and the corresponding sheets 14 and 16 are arranged as a matrix on the induction cooking hob.

In this embodiment, the coil windings 16 and the thermally insulating sheets 16 have elliptical base areas. In general, the coil windings 16 may have arbitrary suitable base areas, such as circular, rectangular and/or square base areas.

The carrier plate 12 is made of a metal sheet or plastic sheet. Preferably, the carrier plate 12 is made of an aluminium sheet. According to the preferred embodiment, the carrier plate 12 includes one or more bend edges 26. In this example, the carrier plate 12 includes two bend edges 26 extending along the longitudinal edges of said carrier plate 12. The bend edges 26 allow a stabilization of the carrier plate 12.

FIG. 2 illustrates a sectional perspective top view of the induction coil assembly 10 according to the preferred embodiment of the present invention. In FIG. 2 the induction coil assembly 10 is arranged upon a coil carrier 28 of the induction cooking hob. The induction coil assembly 10 comprises four lower electrically isolating sheets 14, four coil windings 16, four thermally insulating sheets 16 and the upper electrically isolating sheet 22, wherein two lower electrically isolating sheets 14, two coil windings 16 and two thermally insulating sheets 16 are shown in FIG. 2.

In this example, the carrier plate 12 includes two bend edges 26 extending along the longitudinal edges of said carrier plate 12. The bend edges 26 allow a stabilization of the carrier plate 12.

The ferrite elements 18 are glued or clipped on the carrier plate 12. In this example, the ferrite elements 18 are formed as stripes and star-shaped beneath each lower electrically isolating sheet 14. Alternatively, the ferrite elements 18 may be arranged in any other regular patterns. The lower electrically isolating sheets 14 are arranged on the dedicated ferrite elements 18. Preferably, the lower electrically isolating sheets 14 are glued on the ferrite elements 18. In turn, the coil windings 15 are glued on the dedicated lower electrically isolating sheets 14. The thermally insulating sheets 16 are disposed on the dedicated coil windings 15. The upper electrically isolating sheet 22 is disposed upon the thermally insulating sheets 16.

Each temperature sensor 20 is arranged within the recess 24 formed in the dedicated thermally insulating sheet 16 and coil winding 15 in each case. Each coil winding 15 is connected to a power supply unit and/or a drive unit via two power cables 30. For example, the drive unit is interconnected between the power supply unit and the coils winding 15. The temperature sensor 20 is connected to a control unit via a sensor cable 32. The sensor cable 32 is fixed by a fixation element 34 at one of the power cables 30 of the dedicated induction coil 16. Preferably, the fixation of the sensor cable 32 is close to a plug of said sensor cable 32.

FIG. 3 illustrates a perspective bottom view of the induction coil assembly 10 according to the preferred embodiment of the present invention. The bottom side of the induction coil assembly 10 is formed by the carrier plate 12.

The carrier plate 12 includes a number of bore holes 36 or cut-outs, a number of cable holes 37 and a number of pin holes 38. The bore holes 36 or cut-outs are arranged along a central longitudinal axis of the carrier plate 12. The bore holes 36 or cut-outs may have the same size or different sizes. The cable holes 37 are arranged beside one longitudinal edge of the carrier plate 12. The pin holes 38 are arranged beside the longitudinal edges of the carrier plate 12.

The bore holes 36 or cut-outs are arranged beneath the dedicated temperature sensors 20. By the size of the bore hole 36 or cut-out beneath the temperature sensor 20 the airflow for cooling said temperature sensor 20 may be adjusted. Further, the bore holes 36 or cut-outs may be reinforced by a thicker material around said bore holes 36 or cut-out and/or by a traverse and/or an embossment formed in the environment of said bore holes 36 or cut-outs.

The power cables 30 pass through the cable holes 37. Preferably, for each power cable 30 of each coil winding 15 a dedicated cable hole 37 is provided. The power cables 30 for the different coil windings 16 may have different lengths, so that the cables cannot be plugged to a wrong connector of the power supply unit.

The power cables 30 between the carrier plate 12 and the coil carrier 28 extend horizontally and act as spring elements, so that the induction coil assembly 10 can be pressed or is pressed against the glass ceramic panel of the cooking hob. The power cable 30 includes conductive, shieling and isolating materials, so that the heterogeneous structure of said power cable 30 allows properties like the spring element, in particular in combination with the carrier plate 12. The induction coil assembly 10 does not require any special spring elements.

The pin holes 38 are provided for receiving the pins fastening the coil carriers 14 at the carrier plate 12. For every pin, a hole or press cut is formed in the coil carrier 14. In those portions of the coil carrier 14, which are penetrated by the pin, the material is thicker and/or a traverse and/or an embossment are formed.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 induction coil assembly
12 carrier plate
14 lower electrically isolating sheet
15 coil winding
16 thermally insulating sheet
18 ferrite element
20 temperature sensor
22 upper electrically isolating sheet
24 recess
26 bend edge
28 coil carrier
30 power cable
32 sensor cable
34 fixation element
36 bore hole
37 cable hole
38 pin hole

The invention claimed is:

1. An induction coil assembly for an induction cooking hob, wherein
    the induction coil assembly comprises at least one coil winding, at least one lower electrically isolating sheet and at least one thermally insulating sheet,
    the at least one coil winding is dedicated to one lower electrically isolating sheet and one thermally insulating sheet,
    the at least one coil winding is arranged above the dedicated lower electrically isolating sheet,
    the thermally insulating sheet is arranged above the at least one coil winding,
    the induction coil assembly comprises a carrier plate,
    the carrier plate is provided for supporting the lower electrically isolating sheet, the at least one coil winding and the thermally insulating sheet,
    the carrier plate is made of a metal sheet or of a plastic sheet,
    the induction coil assembly comprises at least two power cables connected to the at least one coil winding and connectable or connected to a power supply unit of the induction cooking hob,
    the induction coil assembly is installable or installed within the induction cooking hob and between a coil carrier and a glass ceramic panel of said induction cooking hob, and
    the power cables are at least partially arranged at a bottom side of the carrier plate and act as spring elements, so that the induction coil assembly is pressed or pressable against the glass ceramic panel of the induction cooking hob.

2. The induction coil assembly according to claim 1, wherein the induction coil assembly comprises two or more coil windings and dedicated lower electrically isolating sheets and thermally insulating sheets, wherein said two or more coil windings and dedicated sheets, respectively, are arranged in series, and wherein the two or more coil windings and/or the thermally insulating sheets have elliptical, circular, rectangular, triangular and/or square base areas.

3. The induction coil assembly according to claim 1, wherein the induction coil assembly comprises at least one temperature sensor.

4. The induction coil assembly according to claim 3, wherein the temperature sensor is arranged within a recess formed in the thermally insulating sheet and/or the at least one coil winding, wherein said recess is formed in a central portion of the thermally insulating sheet and/or the at least one coil winding, respectively.

5. The induction coil assembly according to claim 3, wherein the induction coil assembly comprises at least one sensor cable for each temperature sensor, wherein each said sensor cable is connected to each said temperature sensor on the one hand and connectable or connected to a control unit of the induction cooking hob on the other hand.

6. The induction coil assembly according to claim 3, wherein the carrier plate includes a number of bore holes or cut-outs, wherein at least a part of said bore holes or cut-outs is arranged beneath the temperature sensors, and wherein the size of the bore hole or cut-out beneath the temperature sensor is provided for adjusting an airflow for cooling said temperature sensor.

7. The induction coil assembly according to claim 6, wherein at least a part of said bore holes or cut-outs is reinforced by a thicker material, a traverse and/or an embossment.

8. The induction coil assembly according to claim 3, wherein at least one temperature sensor is dedicated for each induction coil.

9. The induction coil assembly according to claim 1, wherein the induction coil assembly comprises a upper electrically isolating sheet arranged above the one or more thermally insulating sheets.

10. The induction coil assembly according to claim 1, wherein the carrier plate includes a number of cable holes, wherein each cable hole is provided for one power cable, and wherein the cable holes are arranged close to the border of the carrier plate.

11. The induction coil assembly according to claim 1, wherein the carrier plate includes a number of pin holes provided for receiving pins for fastening the carrier plate on a coil carrier of the induction cooking hob.

12. The induction coil assembly according to claim 11, wherein at least a part of said pin holes is reinforced by a thicker material, a traverse and/or an embossment arranged beside the longitudinal edges of the carrier plate.

13. The induction coil assembly according to claim 1, wherein the induction coil assembly comprises a plurality of ferrite elements arranged between the carrier plate and the lower electrically isolating sheet, wherein said ferrite elements are formed as stripes, rectangular sheets or semi-circular sheets arranged radially or according to another regular pattern beneath each lower electrically isolating sheet.

14. The induction coil assembly according to claim 13, wherein the ferrite elements are glued and/or clipped on the carrier plate, wherein the lower electrically isolating sheet is glued or clipped on said dedicated ferrite elements.

15. The induction coil assembly according to claim 1, wherein the at least one coil winding is glued on the dedicated lower electrically isolating sheet.

16. The induction coil assembly according to claim 1, wherein the thermally insulating sheet is disposed on the at least one coil winding, wherein the upper electrically isolating sheet is disposed on the one or more thermally insulating sheets.

17. The induction coil assembly according to a claim 1, wherein the carrier plate includes at least one bend edge formed at one or more sides of said carrier plate, wherein the bend edge is formed at one or two longitudinal sides of the carrier plate.

18. An induction cooking hob comprising the induction coil assembly according to claim 1, wherein said induction coil assembly is arranged within the induction cooking hob and beneath a glass ceramic panel of said induction cooking hob.

* * * * *